US005401231A

United States Patent [19]

Hebert

[11] Patent Number: 5,401,231

[45] Date of Patent: Mar. 28, 1995

[54] TEXTURING ROLLER

[76] Inventor: Jacques O. Hebert, 1691 Greenwood-Mooringsport Rd., Shreveport, La. 71107

[21] Appl. No.: 109,967

[22] Filed: Aug. 23, 1993

[51] Int. Cl.[6] .................. B23P 15/00

[52] U.S. Cl. .................. 492/37; 492/13; 492/17

[58] Field of Search .................. 492/13, 17, 19, 37, 492/48; 15/230.11

[56] References Cited

U.S. PATENT DOCUMENTS

| | | | |
|---|---|---|---|
| 1,464,512 | 8/1923 | Suhr | 492/13 |
| 2,694,874 | 11/1954 | Coolidge, Jr. et al. | 492/13 |
| 4,100,007 | 7/1978 | Van Zeeland | 15/230.11 |
| 4,197,338 | 4/1980 | Perna | 15/230.11 |
| 4,930,179 | 6/1990 | Wright et al. | 15/230.11 |

FOREIGN PATENT DOCUMENTS

| | | | |
|---|---|---|---|
| 890 | 1/1932 | Australia | 15/230.11 |

*Primary Examiner*—Irene Cuda

*Attorney, Agent, or Firm*—John M. Harrison

[57] ABSTRACT

A texturing roller for applying drywall mud or plaster to a flat surface such as a wall or ceiling in a texturing pattern, which roller includes a roller cylinder fitted with random holes and multiple leather discs crowded onto the roller cylinder by rivets which extend through the discs and the holes and are expanded in place by a riveting tool. The roller cylinder is designed to mount on a conventional roller frame and handle normally fitted with a disposable paint cylinder used for painting flat or textured surfaces.

20 Claims, 2 Drawing Sheets

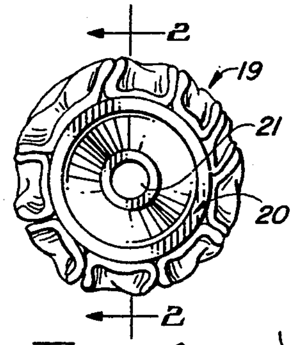
FIG. 1
(PRIOR ART)
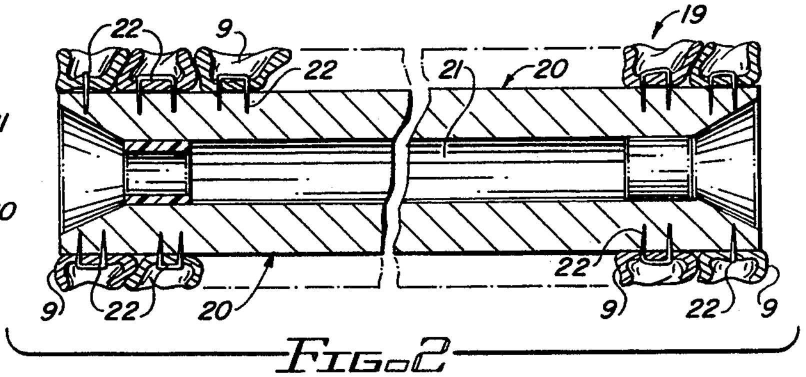
FIG. 2
(PRIOR ART)
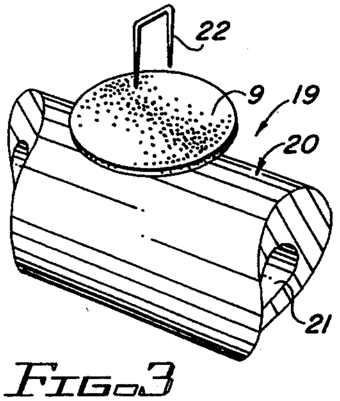
FIG. 3
(PRIOR ART)
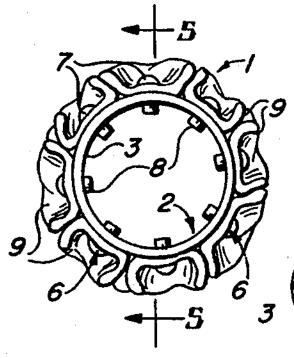
FIG. 4
FIG. 6
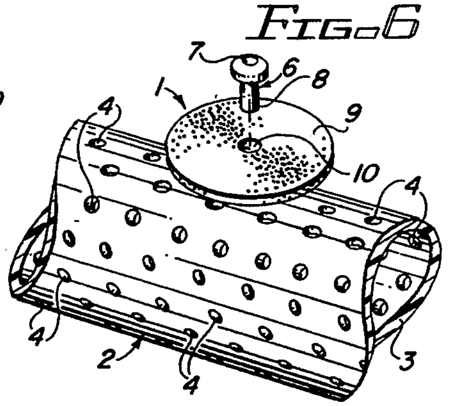
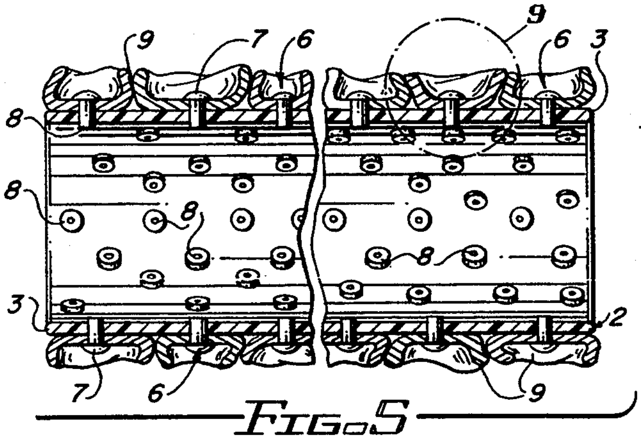
FIG. 5
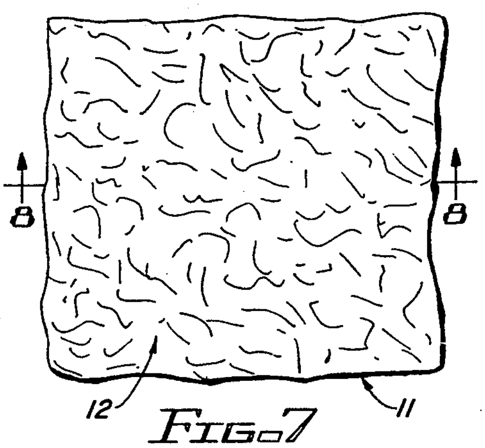
FIG. 7
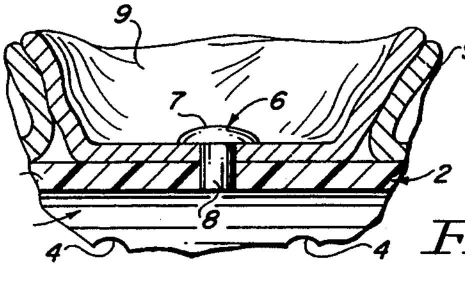
FIG. 9
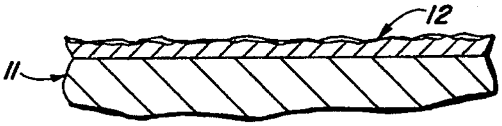
FIG. 8

TEXTURING ROLLER

BACKGROUND OF THE INVENTION

FIELD OF THE INVENTION

This invention relates to the application of drywall mud and plaster to structures and more particularly, to a texturing roller for texturing flat surfaces such as floors, walls and ceilings in structures. The texturing roller is designed to dispense a viscous liquid such as drywall joint compound or "mud", wall plaster materials and the like used in the construction industry. Typically, the texturing roller is rolled through a liquid drywall joint compound or "mud" of suitable viscosity and applied to a floor, wall or ceiling in order to impart a texturing pattern to the floor, wall or ceiling, after which the textured surface is painted and exhibits a decorative effect from the texturing pattern.

One of the problems realized in the application of joint compound or drywall "mud", as well as various plaster mixtures and compositions and floor leveling compounds to walls, ceilings and floors respectively, in the construction industry is that of providing an instrument or tool which will apply a random texturing effect to the flat surface without "skipping", deteriorating or malfunctioning due to applicator design deficiencies. For example, conventional texturing rollers are typically characterized by a wooden cylinder having an opening extending longitudinally through the center thereof for mounting the roller on a special frame having a handle. Multiple leather discs are randomly stapled to the outside surface of the wooden cylinder in close proximity to each other and the radially-extending edges of these crowded, convoluted discs impart a texturing effect to a flat surface such as a floor, wall or ceiling when the texturing roller is rolled through a preparation of joint compound, plaster or other composition, for application to the floor, wall or ceiling. In a typical application, many of the leather discs are torn from the conventional rotating roller cylinder during application of the drywall mud or plaster, since the staples tend to either pull out or break due to rust and repeated use, as the conventional texturing roller is constantly subjected to a water environment. Furthermore, application of the staples to the leather discs in securing the leather discs to the wooden roller produces relatively wide anchor lines across the surfaces of the discs at the heads of the staples, thereby inhibiting the natural curling and convoluted orientation of the discs and muting the desired texturing effect as the roller is operated to apply mud or plaster to the floor, wall or ceiling. Moreover, the specialized frame necessary to mount the conventional wooden texturing roller is somewhat expensive and cannot be used in ordinary painting operations, since it will not accommodate conventional tubular paint rollers extensively used in the trade. Moreover, due to the necessity of using a solid wooden roller in which the staples are anchored, the conventional texturing roller is necessarily heavy, especially when periodically immersed in the water-based drywall mud or plaster, which soaks into the wooden roller after prolonged use.

It is therefore an object of this invention to provide a new and improved texturing roller which is characterized by a roller cylinder having a cylinder bore defining a cylinder wall and capable of fitting on a conventional roller frame. Multiple openings or perforations are provided in the roller cylinder wall for accommodating fasteners such as rivets which crowd multiple leather discs against each other on the outside surface of the roller cylinder to facilitate texturing floors, walls and ceilings with plaster, drywall mud or the like.

Another object of this invention is to provide a texturing roller which is simple in design, durable in construction and is capable of fitting on a conventional paint roller frame and includes a conventional roller cylinder having a cylinder bore for accommodating the paint roller frame cylinder stay and provided with multiple random openings or perforations for accommodating rivets and securing multiple leather discs in crowded fashion to the outside surface of the roller cylinder to facilitate texturing a flat surface such as a floor, wall or ceiling with drywall mud, plaster or a similar material or texturing composition.

SUMMARY OF THE INVENTION

These and other objects of the invention are provided in a new and improved texturing roller for applying drywall mud, plaster or like texturing material to the floors, walls or ceilings of structures, which roller includes a roller cylinder having a cylinder bore for mounting on the cylinder receptacle of a conventional paint roller frame having a handle. The roller cylinder is provided with multiple, random or selectively patterned openings or perforations for receiving rivets such as "pop" rivets which also extend through the center of multiple leather discs to crowd and mount the leather discs on the roller cylinder in convoluted, curled relationship and facilitate texturing a floor, wall or ceiling with drywall mud, plaster or other material using the texturing roller.

BRIEF DESCRIPTION OF THE DRAWING

The invention will be better understood by reference to the accompanying drawing, wherein:

FIG. 1 is an end view of a conventional texturing roller used in the art;

FIG. 2 is a sectional view taken along line 2—2 of the conventional texturing roller illustrated in FIG. 1;

FIG. 3 is a perspective view of a common stapling technique for fastening leather discs on the conventional texturing roller illustrated in FIGS. 1 and 2;

FIG. 4 is an end view of a preferred embodiment of the texturing roller of this invention;

FIG. 5 is a sectional view taken along line 5—5 of the texturing roller illustrated in FIG. 4, more particularly illustrating a preferred technique for attaching leather discs to the roller cylinder of the texturing roller in crowded, convoluted relationship;

FIG. 6 is a perspective view, partially in section, of a segment of the roller cylinder element illustrated in FIGS. 4 and 5, more particularly illustrating a preferred technique for mounting the leather discs using rivets extending through the leather discs and the roller cylinder wall;

FIG. 7 is a front view of a typical texturing surface created using the texturing roller of this invention;

FIG. 8 is a sectional view taken along 8—8 of the texturing surface illustrated in FIG. 7;

FIG. 9 is an enlarged view of a typical disc-rivet-roller cylinder connection in the texturing roller illustrated in FIGS. 4–6;

DESCRIPTION OF THE PREFERRED EMBODIMENTS

Figure 10:
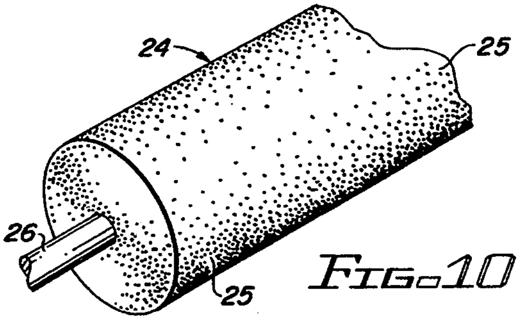
FIG. 10 is a perspective view of a typical hone used to remove the ends of the rivets projecting into the bore of the roller cylinder in the texturing roller of this invention.

Referring initially to FIGS. 1–3 of the drawings, a conventional texturing roller 19 is illustrated and is characterized by a cylindrically-shaped wooden roller block 20, fitted with a longitudinal, centered block opening 21 for receiving a special roller frame (not illustrated). Multiple leather discs 9 are crowded together and attached to the surface of the wooden roller block 20 in curled, convoluted relationship by means of staples 22, in order to impart a desired texturing effect to a wall or ceiling (not illustrated) when the conventional texturing roller 19 is dredged or rolled through a supply of drywall mud or plaster (not illustrated) and the exposed convoluted saturated edges of the leather discs 9 contact the surface to be treated.

Figure 11:
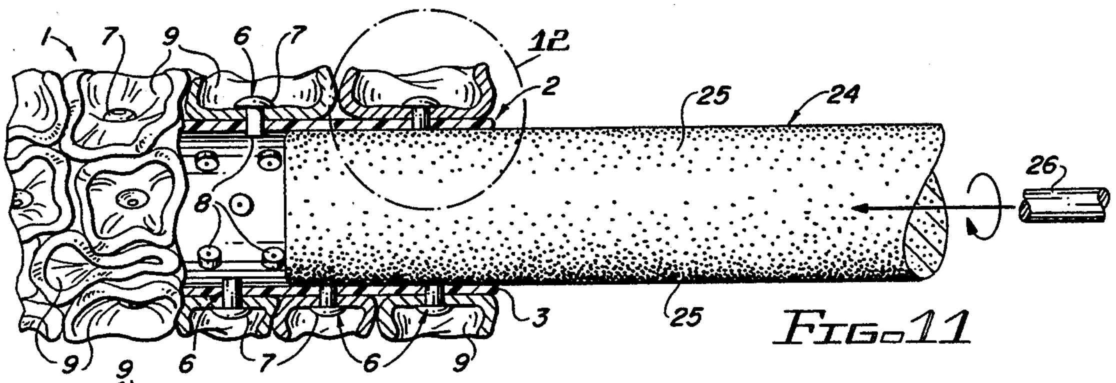
FIG. 11 is a sectional view of the hone and texturing roller illustrated in FIGS. 5 and 6, more particularly illustrating operation of the hone.
Figure 12:
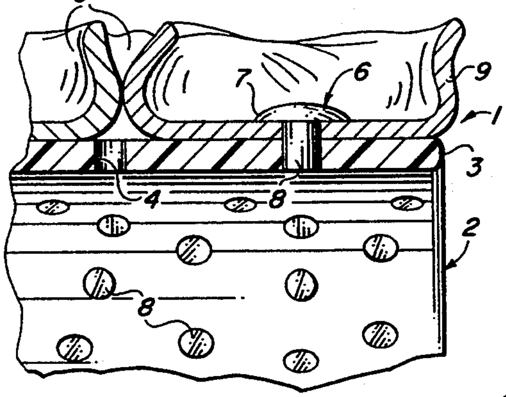
FIG. 12 is an enlarged view of the hone-disc-rivet-roller cylinder connection in the texturing roller of this invention.
Figure 13:
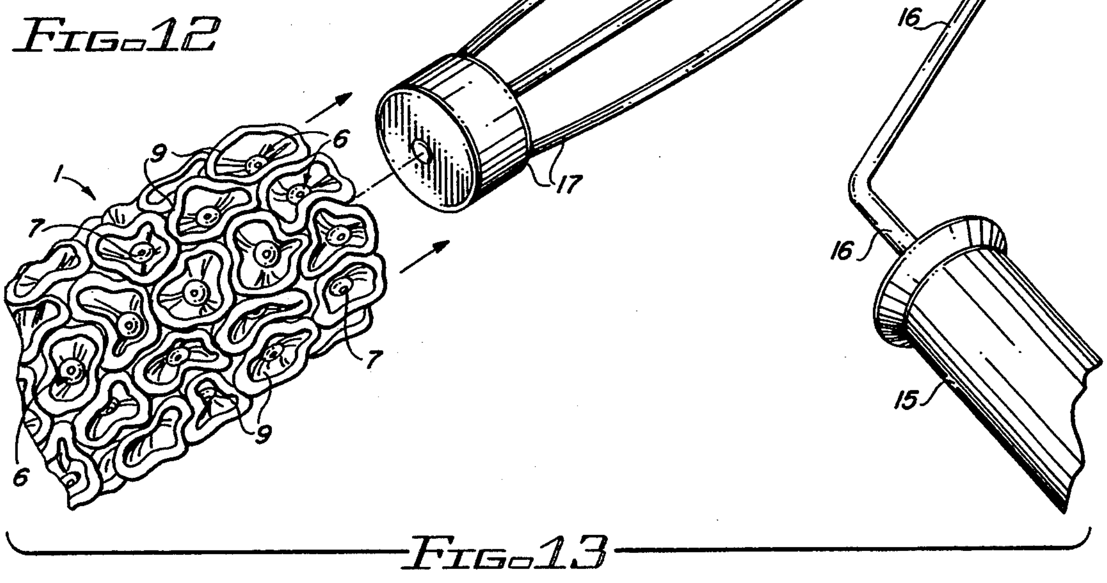
FIG. 13 is a perspective view of the texturing roller of this invention and a conventional paint roller assembly for receiving the texturing roller.

Referring now to FIGS. 4–6 and 9–13 of the drawings, the texturing roller of this invention is generally illustrated by reference numeral 1. The texturing roller 1 is characterized by a roller cylinder 2 which may be constructed of a metal such as aluminum or of a moldable material such as fiberglass or plastic, in non-exclusive particular, and is designed to removably friction-fit on the cylinder stay 17 of the roller mount 16 of a conventional point roller frame 14, having a frame handle 15, as illustrated in FIG. 13. Accordingly, it will be appreciated that the texturing roller 1 is designed to be used with the same conventional paint roller frame 14 that is also commonly used to receive disposable cylindrical paint pads for painting floors, walls and ceilings in conventional fashion. The roller cylinder 2 is characterized by a cylinder wall 3 of selected thickness and includes multiple, random or patterned rivet openings 4, drilled or otherwise perforated in the cylinder wall 3 in close proximity to each other and communicating with the roller cylinder bore 5, as illustrated in FIGS. 4–6. Rivets 6 are then extended through disc openings 10 in the centers of the respective multiple leather discs 9, such that the rivet heads 7 engage the approximate centers of the respective flexible leather discs 9 and the rivet shanks 8 extend through the rivet openings 4 in the cylinder wall 3, where they are typically expanded in place using a conventional riveting tool (not illustrated). The expansion of the rivet shanks 8 in the respective rivet openings 4 and extension of the ends of the rivet shanks 8 inside the roller cylinder bore 5 of the roller cylinder 2 as illustrated in FIGS. 4, 5 and 11, requires the use of a honing tool 24, illustrated in FIGS. 10 and 11, which may be inserted in the roller cylinder bore 5 and used to hone or grind the projecting ends of the rivet shanks 8 substantially flush with the inside surface of the cylinder wall 3, as illustrated in FIGS. 9, 11 and 12. This expedient facilitates mounting of the roller cylinder 2 on the conventional cylinder receptacle 17 in removable fashion. In a preferred embodiment the honing tool 24 is equipped or provided with abrading surface projections 25 and is mounted on a tool shaft 26, which attaches it to a driving tool such as a drill or other tool (not illustrated) to effect rotation of the honing tool 24 inside the roller cylinder bore 5 of the roller cylinder 2. As further illustrated in FIGS. 4, 5, 9 and 12, the flexible leather discs 9 are attached by means of the rivets 6 to the roller cylinder 2 in closely spaced, random or patterned relationship to achieve a crowded disc arrangement where each of the leather discs 9 is curved and convoluted to expose a shaped edge radially outwardly of the curved cylinder wall 3. It is these multiple, randomly convoluted edges that receive the drywall mud or plaster material and serve to imprint the desired drywall mud, plaster or other texturing medium pattern on a flat wall, ceiling or floor.

Referring now to FIGS. 7 and 8 of the drawings, the texturing roller 1 of this invention is capable of producing a texturing pattern 12 on a flat wall segment 11, which texturing pattern 12 is uniform, although random, and is pleasing and decorative in appearance, without undesirable skips or breaks. In contrast to this uniformity, the conventional texturing roller 19 illustrated in FIG. 1 is characterized by undesirable skips and breaks in the texturing pattern 12 due to inadvertent removal in a random fashion, of various flexible discs 9 from the roller block 20, due to dislodging or breaking of the respective mounting staples 22. In some cases, one or more discs 9 are retained in the texturing pattern 12 on the wall, floor or ceiling to which the texturing pattern 12 is being applied and must be removed from the texturing pattern and that area re-textured, thereby requiring additional labor and time.

In a most preferred embodiment of the invention the flexible discs 9 are characterized by leather discs about $1\frac{1}{4}$ inches in diameter and the rivets 6 are each characterized by "pop" rivets having a length of about 1/16 of an inch. However, it will be appreciated by those skilled in the art that the discs 9 may be constructed of material other than leather and in various sizes to produce a texturing pattern 12 on a wall or ceiling segment 11 having desired characteristics. Furthermore, the rivets 6 may be of various length and diameter, depending upon the thickness of the cylinder wall 3 of the roller cylinder 2 and the chosen diameter of the rivet openings 4, although the cylinder walls 3 of the conventional roller cylinders 2 are generally quite uniform in thickness. Moreover, other fasteners may be used according to the knowledge of those skilled in the art, although rivets, and "pop" rivets in particular, are preferred, due to ease of application and honing to facilitate mounting the texturing roller 1 on the cylinder receptacle 17 and roller mount 16 of a conventional roller frame 14.

It will be further appreciated by those skilled in the art that the nature and characteristics of the texturing pattern 12 on the wall segment 11 illustrated in FIGS. 7 and 8 may be determined by selection of the spacing and pattern of the rivet openings 4 in the cylinder wall 3 of the roller cylinder 2, as well as the size and flexibility of the discs 9. Accordingly, the pattern of the rivet openings 4 may be staggered, as illustrated in FIGS. 6 and 11, or random, as illustrated in FIGS. 5 and 12 or otherwise spatially determined in selected center-to-center dimensions to "crowd" the leather discs 9 in place on the roller cylinder 2 and create a selected curled, convoluted, radially projecting disc edge pattern.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. In a texturing roller of the type having a conventional paint roller frame characterized by a frame handle, an offset roller mount extending from the handle and a cylinder stay rotatably mounted on the roller mount, the improvement comprising a roller cylinder having an outside surface and an inside surface defining a cylinder bore for mounting on the cylinder stay; a plurality of openings provided in a selected pattern in said roller cylinder; a plurality of flexible disks positioned over said openings on said outside surface of said roller cylinder; and rivets extending through said flexible disks and said openings for securing said flexible disks to said outside surface of said roller cylinder in said selected pattern.

2. The texturing roller of claim 1 wherein said selected pattern comprises a random pattern.

3. The texturing roller of claim 1 wherein each of said rivets includes a head portion for engaging said flexible disks and a shank portion for expansion in said openings.

4. The texturing roller of claim 1 wherein:

(a) said selected pattern comprises a random pattern; and (b) each of said rivets includes a head portion for engaging said flexible disks and a shank portion for expansion in said openings.

5. The texturing roller of claim 1 wherein said flexible discs are leather.

6. The texturing roller of claim 5 wherein said selected pattern comprises a random pattern.

7. The texturing roller of claim 5 wherein each of said rivets includes a head portion for engaging said flexible disks and a shank portion for expansion in said openings.

8. The texturing roller of claim 5 wherein:

(a) said selected pattern comprises a random pattern; and (b) each of said rivets includes a head portion for engaging said flexible disks and a shank portion for expansion in said openings.

9. The texturing roller of claim 1 wherein said selected pattern comprises a staggered pattern.

10. The texturing roller of claim 9 wherein each of said rivets includes a head portion for engaging said flexible disks and a shank portion for expansion in said openings.

11. The texturing roller of claim 9 wherein said flexible discs are leather.

12. The texturing roller of claim 9 wherein:

(a) each of said rivets includes a head portion for engaging said flexible disks and a shank portion for expansion in said openings; and (b) said flexible discs are leather.

13. The texturing roller of claim 1 wherein said rivets extend into said cylinder bore and comprising hone means for insertion in said cylinder bore and grinding said rivet substantially flush with said inside surface.

14. The texturing roller of claim 13 wherein said rivets extend through substantially the center of said flexible discs and said flexible discs are leather.

15. The texturing roller of claim 14 wherein said rivets comprise "pop" rivets, each of said "pop" rivets having a head portion for engaging said flexible discs and a shank portion for expansion in said openings.

16. The texturing roller of claim 15 wherein said selected pattern comprises a random pattern.

17. The texturing roller of claim 15 wherein said selected pattern comprises a staggered pattern.

18. In a texturing roller of the type having a conventional paint roller frame characterized by a frame handle, an offset roller mount extending from the handle and a cylinder stay rotatably mounted on the roller mount, the improvement comprising a roller cylinder having an outside cylindrical surface and a longitudinal cylinder bore defining a cylinder wall, for mounting on the cylinder stay; a plurality of openings provided in said cylinder wall in a selected pattern and spacing; a plurality of flexible disks arranged over said openings on said cylinder wall in overlapping, convoluted relationship with respect to each other; and rivets extending through said flexible disks and said openings for securing said flexible disks to said cylinder wall of said roller cylinder in said selected pattern and spacing.

19. The texturing roller of claim 18 wherein said flexible disks are leather and said rivets comprise "pop" rivets having a head portion engaging said disks substantially in the center of said disks and a shank portion expanded in said openings.

20. In a texturing roller of the type having a conventional paint roller frame characterized by a frame handle, an offset roller mount extending from the handle and a cylinder stay rotatably mounted on the roller mount, the improvement comprising a roller cylinder having an outside cylindrical surface and a longitudinal surface bore for receiving the conventional paint roller frame; a plurality of openings provided in said cylinder wall in a selected pattern and spacing; a plurality of flexible leather disks arranged over said openings on said cylinder wall in overlapping, convoluted relationship with respect to each other; and "pop" rivets extending through substantially the center of said flexible disks and said openings for expansion in said openings and securing said flexible disks to said outside cylindrical surface of said cylinder wall of said roller cylinder in said selected pattern.

* * * * *